United States Patent [19]
Jäger et al.

[11] Patent Number: 5,915,895
[45] Date of Patent: Jun. 29, 1999

[54] DRILLING AND CHAMFERING TOOL

[75] Inventors: Horst Jäger, Nürnberg; Michael Schuffenhauer; Gebhard Müller, both of Fürth; Bernhard Borschert, Nürnberg; Ulrich Krenzer, Zirndorf, all of Germany

[73] Assignee: Kennametal Hertel AG Werkzeuge and Hartstoffe, Fürth, Germany

[21] Appl. No.: 08/356,251

[22] PCT Filed: Apr. 23, 1994

[86] PCT No.: PCT/DE94/00450

§ 371 Date: Dec. 22, 1994

§ 102(e) Date: Dec. 22, 1994

[87] PCT Pub. No.: WO94/25210

PCT Pub. Date: Nov. 10, 1994

[30] Foreign Application Priority Data

Apr. 23, 1993 [DE] Germany .................. 93 06 141 U
Mar. 9, 1994 [DE] Germany .................. 94 03 927 U

[51] Int. Cl.⁶ .................................................. B23B 51/00
[52] U.S. Cl. ..................... 408/225; 408/231; 408/713
[58] Field of Search ................................ 408/224, 225, 408/713, 232, 231, 153, 180, 181, 179, 185, 190; 407/41, 42

[56] References Cited

U.S. PATENT DOCUMENTS 2,042,081  5/1936  Van Deusen et al. ............ 407/41 X
3,726,352  4/1973  Olov Roos ..................... 408/224 X
4,171,656  10/1979  Gargrave ..................... 408/231 X
4,197,042  4/1980  Krhounek et al. ............... 408/225
4,353,670  10/1982  Jorgensen .
4,610,285  9/1986  Derivaz ........................ 407/41
4,611,959  9/1986  Kress et al. ................. 408/713 X
4,693,641  9/1987  Tsujimura et al. ............... 407/42
5,071,295  12/1991  Greig ........................ 408/225
5,265,988  11/1993  Schmigalla et al. ............. 408/225

FOREIGN PATENT DOCUMENTS

146030    6/1985   European Pat. Off. .
0248775  12/1987   European Pat. Off. .......... 408/224
598473   12/1925   France .
9004316   8/1990   Germany .
9206148   9/1992   Germany .

Primary Examiner—Andrea L. Pitts
Assistant Examiner—Henry W. H. Tsai
Attorney, Agent, or Firm—Venable; George H. Spencer; Catherine M. Voorhees

[57] ABSTRACT

A rotary tool for drilling and chamfering, which takes place in one common advance, essentially comprises a base body, a drill clamped centered therein and a chamfering tool disposed on the end of the base body toward the drill tip and having a cutter body tip disposed next to the flank of the lateral free face of the drill. The chamfering tool can be radially adjusted in relation to the drill in a direction pointing at right angles in respect to the drill axis.

31 Claims, 12 Drawing Sheets

DRILLING AND CHAMFERING TOOL

BACKGROUND OF THE INVENTION

The invention relates to a rotary tool effective as a drilling and chamfering tool for drilling and chamfering in one common drill advancing movement, having a tool holder comprising a base body having a longitudinal axis and oppositely located ends. A drill is concentrically clamped in the base body relative to the longitudinal axis to project from one of the ends of the base body. A chamfering tool is located at the one end of the base body and includes a chamfer cutter having a tip displaceable toward the drill and into a region of a lateral free face of the drill.

Such a tool, known from DE-U-92 06 148 has a carriage on the end toward the drill of the base body clamping the drill shank, which is equipped with a cutter body for chamfering and can be displaced in respect to a lateral free face of the drill, as the support of a cutter body, which countersinks or chamfers the drill hole drilled by the drill during the advancing movement taking place in the axial direction of the drill. By means of this it is possible to produce such drilling and chamfering tools of any arbitrary drilling diameter, using standard drills. The chamfering tool or the chamfering cutter, which is to be combined with the drill, can be flexibly adapted to the working diameter of the drill because of the carriage-like advancement ability. In the process, drills with the same shank diameter can be clamped into one base body, however, the working diameter of the individual drill to be clamped into the same base body can deviate from the uniform shank diameter.

If in such a drilling and chamfering tool a standard drill with a working diameter A is replaced by a standard drill with another working diameter B, the chamfering tool must be adapted to the operating diameter of the new drill. This is accomplished by means of a carriage-like adjustability in respect to the base body. In the known tool of the type mentioned at the outset, this adjustment or advancing direction of the chamfering tool forms an acute angle with the drill axis. This means that the standard setting is changed by the advancing movement of the chamfering tool. This standard setting is the distance of the cutting tip of the chamfering tool from the drill tip. Thus, a change of the working diameter of the drill inevitably means a change of the standard setting. A new setting of the drill depth is therefore always required to keep the chamfering depth of the tool constant, following a change of diameter.

SUMMARY OF THE INVENTION

A contrast of the known tool, in accordance with the present invention, the chamfer cutter is displaced in a direction of adjustment extending at a right angle to the longitudinal axis. Thus the chamfering depth is kept constant even with a change of the working diameter of the drill and subsequent adjustment of the chamfer cutter body. In this case it is assumed that standard drills with the same shank diameter, but different working diameters, essentially have the same working length in the axial direction.

The invention further relates to a drilling and chamfering tool or a drilling-counterbore tool of the type mentioned at the outset, regardless of whether the advancing direction of the chamfering tool is right-angled in accordance with the invention or at an acute angle in accordance with the state of the art. Here the chamfering tool is clamped to the base body secure against oscillations and is embodied in such a way that the chip removal is not hampered. In this case the cutting tip of the chamfering tool, which has a comparatively narrow corner angle E of approximately 45°, is particularly critical. This is the angle between the main cutting edge, which determines the cone angle of the counterbore and which is at an angle of 45° in respect to the drill axis or the drill hole axis, for example, and the minor cutting edge, which lies at the side of the lateral free face of the drill. The corner angle is in particular danger of breaking because of its acuteness. At best, it can be pressed slightly radially against the lateral free face of the drill, since otherwise there is increased danger of damage Ideal conditions occur when the tip of the chamfering tool maintains a small distance from the lateral free face of the drill and when there is only the required cutting edge projection between the drill cutting edge and the counterbore or chamfer cutting edge. Although up to now only one chamfering tool at one base body was mentioned and in the singular, in the same way it is possible and even customary to provide, distributed over the drill circumference, a number of chamfer cutting edges or chamfering tools corresponding to the number of drill cutting edges.

The base body is typically provided with a mounting face and a base body groove extending in a longitudinal direction approximately parallel with the direction of adjustment and formed within the mounting face. The chamfering tool has a plate-shaped cutter body having a contact face contacting the mounting face, and a contact projection extending away from the contact face and engaging with the base body groove. The cutter body is clamped to the mounting face in one of a plurality of arbitrary displacement positions and in a direction corresponding to a line located within an angle formed by the mounting face and the contact position. Thus, secure clamping and resting of the cutter body on the base body in the circumferential direction, which absorbs the main cutting pressure, as well as in the drill advance direction, is assured.

Particularly secure, defined clamping of the chamfer cutter body on the base body is assured by a contact projection comprising a contact rib extending essentially in the direction of adjustment. The contact rib extends essentially over an entire width of the cutter body and at an approximate right angle to the longitudinal axis. The contact projection includes a pressure flank, and the base body groove is defined by a groove contact flank. The cutter body is pressed in an approximate direction toward a tip of the drill so that the pressure flank is pressed with a first force against the groove contact flank, and the contact face is pressed against the mounting face with a second force approximately equal to the first force.

Typically, the cutter body has an end located away from a tip of the drill, and includes a top face, a rear face and an inclined face comprising a chamfered edge therebetween. Holding means, such as a clamping screw, are provided for exerting a holding force against the chamfered edge acting in a direction approximately perpendicular to the chamfered edge. Thus, the desired clamping direction is maintained.

The simplest clamping could be performed by providing a clamping screw comprising a flathead screw having a head flank, with the flathead screw being screwed into the base body in a direction approximately perpendicular to the mounting face. However, this clamping is more secure if the holding means comprises a clamping screw having a screw head, and a clamping claw is provided having an opening accommodating the clamping screw therein and a pressure cam, so that the said screw head acts against the clamping claw to cause the clamping claw to act against the inclined face.

If the claw is only seated on the screw, it is canted in respect to the screw because of the eccentricity of its trigger cam resting on it. To counteract such canting. The clamping screw is provided with a screw shank having one end connected to the screw head, and the clamping claw includes an annular collar enclosing the one end of the screw shank for guiding the clamping screw in an axial direction.

Further, the screw head can be provided with an upper screw face, and the clamping claw with a backward grip crimped inward toward an axis of the clamping screw to enclose the upper screw face and restrain the screw head. This makes possible the captive fixation of the claw on the screw.

The clamping claw has a circumferential side, and the base body groove is defined by a lateral wall positioned away from the tip of the drill. A portion of the circumferential side is positioned away from the chamfering tool supported by the lateral wall. A clamping pin may be inserted into the base body parallel with an axis of the clamping screw and having a flank supporting the portion of the clamping claw.

Thus, the effect of the eccentricity of the action of the force on the claw cam is neutralized to the extent possible. The circumferential side of the clamping screw may include a recess formed therein extending in a longitudinal direction to be essentially parallel to the axis of the clamping screw, so that the clamping pin is received within the recess to prevent a relative rotation of said clamping claw. This assures the straight movement of the claw during its clamping movement.

The chamfer cutter may have a rear face defining a trough. The shank of the screw or the annular collar of the chamfer cutter is typically at least partially positioned within the trough to prevent a loss of the chamfer cutter over an entire range of displacement positions. Thus, the loss of the cutter body is prevented even if the holding screw or clamping claw is not tightened.

Preferably, a spring member projects beyond the groove contact flank and toward the pressure flank and is located in a region of an end of the base body groove. The spring member comprises a circumference of a clamping pin, with the clamping pin being inserted into the base body in a direction approximately parallel to an axis of the clamping screw. This represents a particularly important further development, which allows the easy and safe adjustment of the chamfering tool on the base body in respect to different working diameters of the drill. With the holding screw loosened, the chamfering tool needs to be brought toward the drill only so far that the tip of the chamfer cutter body comes into contact with the lateral free face of the drill. If the holding screw is then tightened, the spring element is automatically compressed until the contact rib of the cutter body comes into contact with the bearing flank of the groove. In the process the tip of the chamfer cutter body is lifted by a small amount, predetermined by the value of the spring travel, from the lateral free face of the drill. The desired distance from the lateral free face is created there which, however, still assures the required projection of the cutting edge beyond the counterbore area because of the size of the spring compression travel.

Typically, the contact rib has a length extending in the direction of adjustment and has a width extending at a right angle to the direction of adjustment. The base body groove preferably has a first width approximately corresponding to the width of the contact rib, and a second width in a region of an end of the base body groove located adjacent to the drill. The second width is larger than the first width by approximately a distance corresponding to the distance the spring member projects beyond the groove contact flank. Thus, the free space required for the compensating movement is provided for.

A particularly useful device for clamping the drill to the base body is also within the coverage of the present invention. At least one holding screw, and a metallic chuck positioned within the base body and enclosing the drill are provided. The chuck includes at least one shell tongue radially deflectable and extending over a portion of a circumference of the chuck. The shell tongue is defined by at least two essentially parallel circumferentially arranged slits and an axially arranged chuck shell slit. The holding screw extends approximately radially through a wall of the base body and acts against the shell tongue to press the shell tongue against a shank of the drill. The metallic chuck is composed of hardened steel, and preferably spring steel. The circumferentially arranged slits extend over a circumferential angle of approximately 270°. The shell tongue has a free end pointing in a drill rotation direction. Means for limiting a screw-in depth of the holding screw are provided.

Alternatively, instead of a clamp as described above, the base body may include a traverse bore in a region of a shank of the drill. A spring element may then be located in the transverse bore, and at least one holding screw extending approximately radially through a wall of the base body and acting against the spring element indirectly clamps the shank of the drill. Alternatively, the base body may include a hole tangential to a shank of the drill. A clamping wedge is located in the hole and tangentially engaging with the shank of the drill. The holding screw acts against the clamping wedge to indirectly clamp the shank of the drill.

The subject of the invention will be described in detail by means of exemplary embodiments represented in the drawings. Shown are in FIG. 1, a longitudinal section through the tool in accordance with the invention, FIG. 2, a front view of the tool in the direction of the arrow II in FIG. 1, FIG. 3, an enlarged view of the lower tool end in the area III of FIG. 1 with clamped chamfer cutter body, FIG. 4, a top view analogous to FIG. 3 of the seating of the chamfer cutter body with the clamping claw removed and with the position of the chamfer cutter body, which is in initial clamping position indicated by dash-dotted lines, FIG. 5, a representation analogous to FIG. 4 with the end clamping position of the chamfer cutter body indicated, FIG. 6, a representation analogous to FIG. 4 with the cutter body in the initial clamping position and acted upon by the clamping claw, FIG. 7, a section along the line VII—VII in FIG. 6 through the clamping means for fixing the chamfer cutter body in place, FIG. 8, a top view of the chip surface of the chamfer cutter body, FIG. 9, a lateral view in the direction of the arrow IX of FIG. 8, FIG. 10, a front view of the cutter body in the direction of the arrow X of FIG. 8, FIG. 11, a top view of a modified embodiment of a chamfer cutter body and clamping claw, FIG. 12, a partial section corresponding to the line XII—XII of FIG. 11, FIG. 13, a lateral view—partially in section—of the holding screw and clamping claw, FIG. 14, a top view of the clamping claw, FIG. 15, a lateral view of the clamping claw partially in section, FIG. 16, a sectional view of the base body in the area of the cutting plate seat analogous to FIG. 7, FIG. 17, a top view of the cutter body in accordance with the arrow XVII in FIG. 16, FIG. 18, a perspective view of the drill with the clamping chuck enclosing its shank and with the clamping screws symbolically indicated, FIGS. 19 a to c, different cross-sectional views in the area of the drill clamping with different rotational positions of the drill in respect to the base body, FIGS. 20a–c, the clamping chuck enclosing the drill shank during clamping—partially in section—in different rotational positions, FIG. 21, a section in accordance with the section line XXI—XXI of FIG. 20c, FIG. 22, a section in accordance with the section line XXII—XXII of FIG. 20b, and FIGS. 23 and 24, cross-sectional representations of modified embodiments of the drill clamping analogous to FIG. 19.

DETAILED DESCRIPTION OF THE INVENTION

Figure 1:
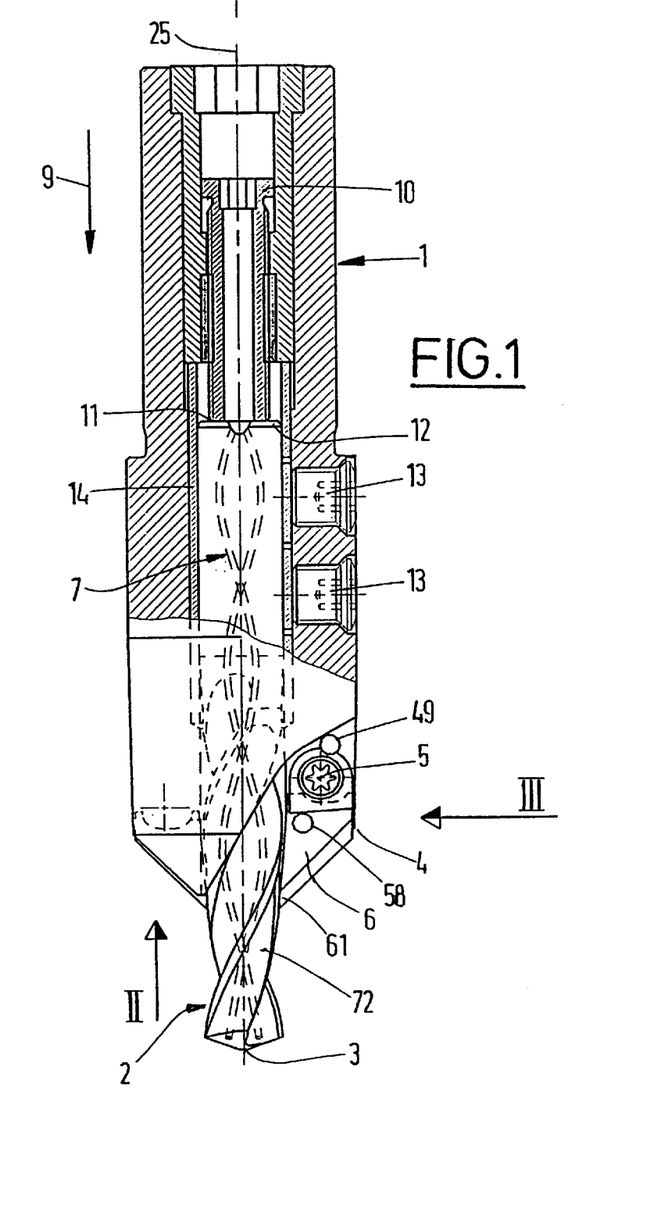
Figure 2:
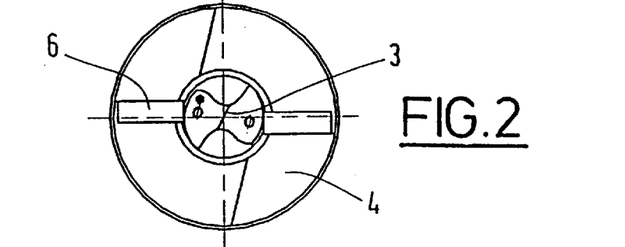

The drilling and chamfering tool essentially consists of the base body 1 with the drill 2 clamped in it, and with the chamfer cutter body 6 disposed on the front end 4 of the base body 1 facing the drill tip 3 and clamped by the clamping screw 5. The drill 2 contains the shank 7 and the drill end, spiraled along the circumference and equipped with the operating diameter 8, which projects out of the base body 1.

The drill 2 can be adjusted in the axial direction 9 by means of an advancing device 10. The advancing device 10 is an adjusting spindle, whose pressure end 11 acts on the rear shank end 12 of the drill 2. Clamping of the drill 2 is accomplished by means of holding screws 13 which radially extend through the pipe-shaped base body 1 and act on a sheet steel chuck 14 enclosing the shank 7 of the drill 2.

Figure 7:
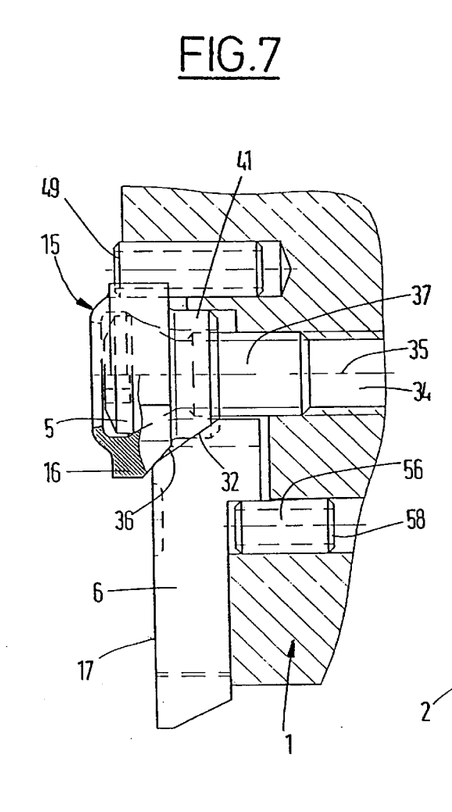

The chamfer cutting tool disposed on the lower front face 4 of the base body 1 essentially consists of the cutter body 6 and the clamping claw 15, on which the clamping screw 5 acts and which in turn acts with its cam 16 FIG. 7 on the rear end of the cutter body 6.

Figure 8:
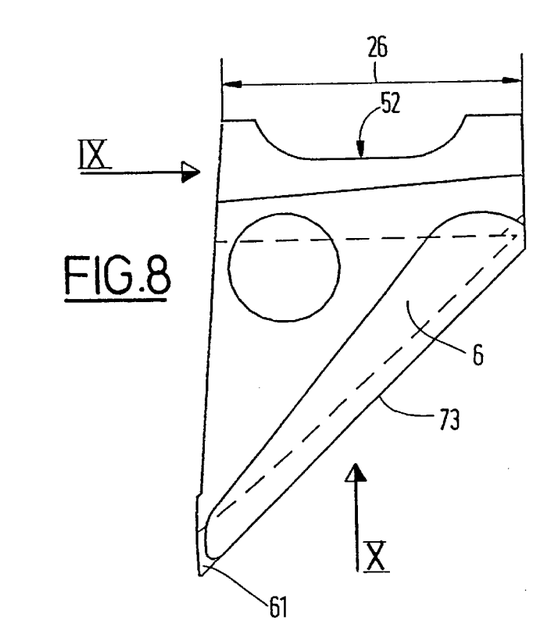
Figure 9:
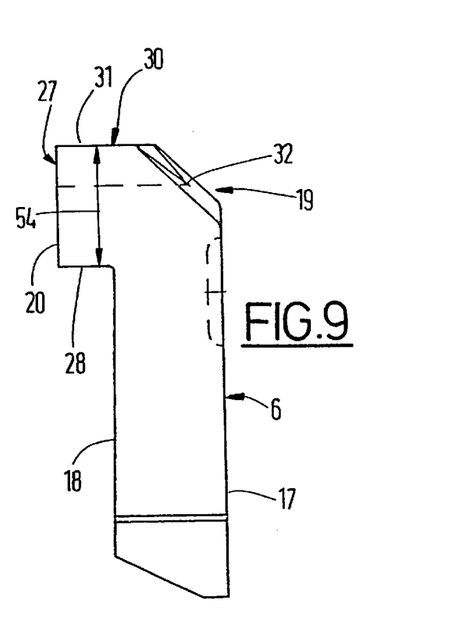
Figure 10:
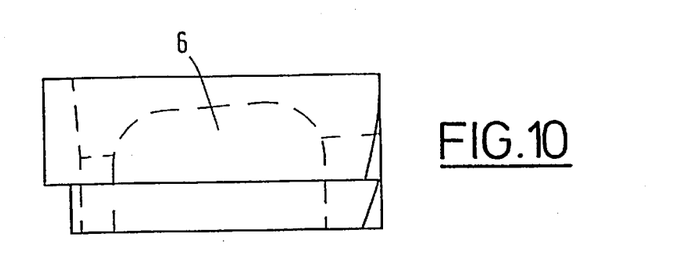
Figure 16:
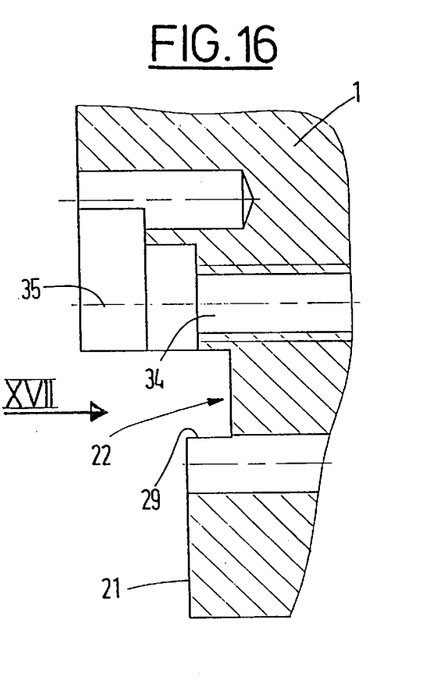
Figure 17:
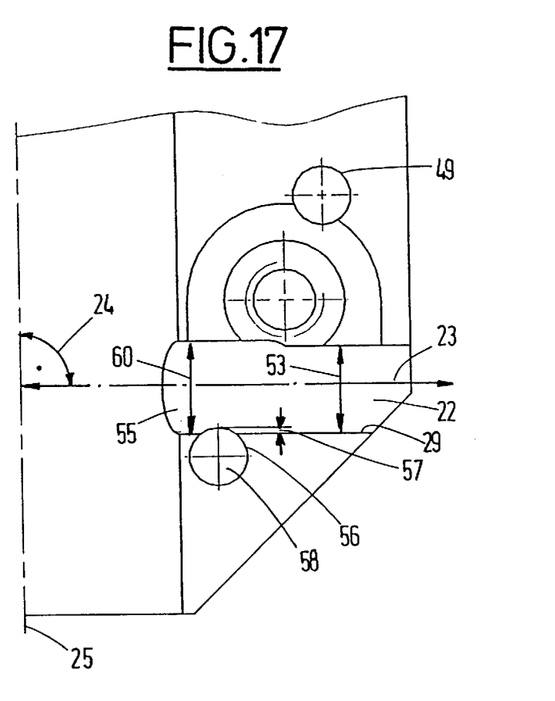

The cutter body 6 is shown by itself in FIGS. 8 to 10. Its top face 17 and its contact face 18 are plane-parallel. At its rear end 19, a contact projection 20 extends at approximately right angles beyond the contact face 18. With this contact projection 20, the cutter body 6 engages a base body groove 22 which is deeper than the mounting face 21 of the base body 1 and whose longitudinal axis 23 extends at a right angle 24 with respect to the drill and base body axis 25 (FIGS. 16 and 17 ). The cutter body 6 can be radially adjusted in respect to the base body axis 25 inside the base body groove 22. The adjusting direction extends at right angles in respect to the base body axis 25. The cutter body 6 can be clamped in place inside the groove 22 in any arbitrary adjustment position by means of the clamping claw 15. The contact projection is a contact rib 27 extending over the entire width 26 of the cutter body 6.

In the assembled state, the cutter body 6 is pressed by cohesion with its contact projection 20 or the pressure flank 28 of its contact rib 27 against the groove contact flank 29 on the side. of the drill tip in the approximate direction of the drill tip 3, and additionally its contact face 18 acts upon the mounting face 21 on the base body 1.

The end 30 of the cutter body 6, which in the assembled state faces away from the drill tip 3, is provided between the top face 17 and the rear face 31 with an inclined face 32 embodied in the manner of a chamfer edge, which acts between top face 17 and rear face 31, and which is acted upon essentially perpendicularly by the holding screw 13 or by the cam 16 of the clamping claw 15. This action can take place directly by means of the head flank of a flathead screw, which is screwed approximately perpendicularly to the mounting face 21 into the base body 1, for example into the screw hole 34 (FIG. 16). Its axis is identified by 35.

Two different forms of clamping claws are shown in the exemplary embodiments. The cam 16 of the clamping claw 15 has a pressure face 36 which is approximately parallel in respect to the-inclined cutter body face 32 and which extends at a tangent to the inclined face 32 in the area of the transition of the inclined face into the top cutter body face 17. In the exemplary embodiment represented in FIG. 7, there is a clear angle between the inclined face 32 and the pressure face 36. In the tightened state, the clamping claw 15 is slightly canted in respect to the longitudinal axis 35 of the screw hole 34 receiving the screw shank 37 of the clamping screw 5, and because of this, the pressure face 36 extends more parallel with the inclined face 32.

Figure 13:
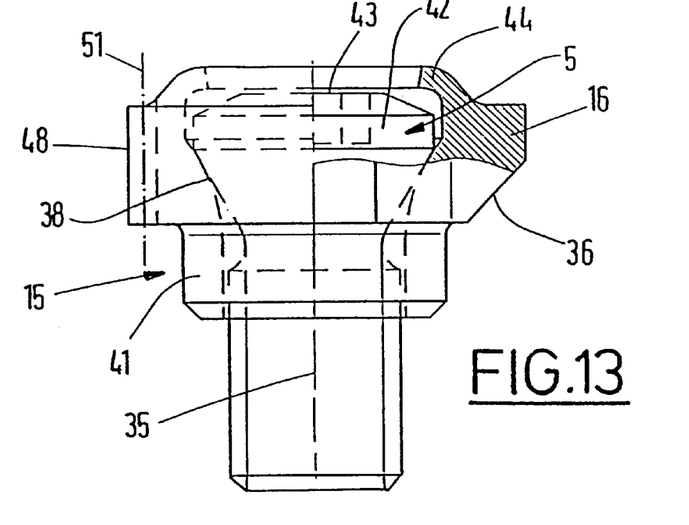

The cone angle of the cone shell 38 of the clamping screw 5 approximately corresponds to the interior cone 39 of the clamping claw 15 (FIG. 13).

An annular collar 41 for enclosing the head end of the screw shank 37 for the purpose of guidance is formed in the head area of the clamping claw 15 in the axial direction 40 of the screw 5 (FIG. 13). Annular collar 41 is used for increased axial alignment and support of the clamping claw 15 in respect to the base body 1 and the cutter body 6. The claw 15 encloses the annular edge 42 of the top screw face 43 by means of a backward grip 44 which is crimped inwardly in respect to the screw axis 35, and in this way assures that the clamping claw 15 is held captive in respect to the clamping screw 5.

Figure 11:
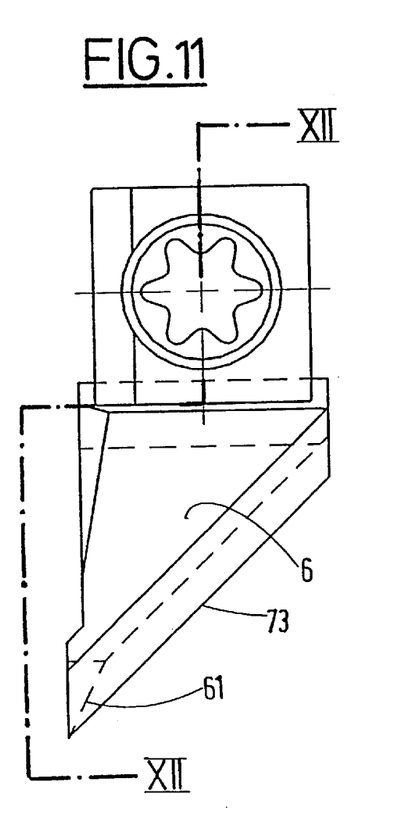
Figure 12:
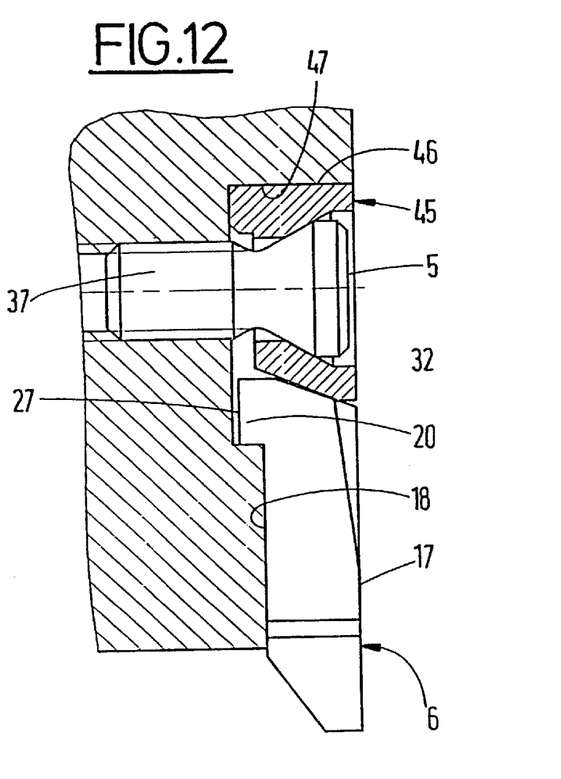

In an alternate embodiment represented in FIGS. 11, 12, the circumferential side 46 of the clamping claw 45 facing away from the cutter body 6 is supported by the lateral wall 47 of the base body groove 22 facing away from the drill tip 3.

Figure 3:
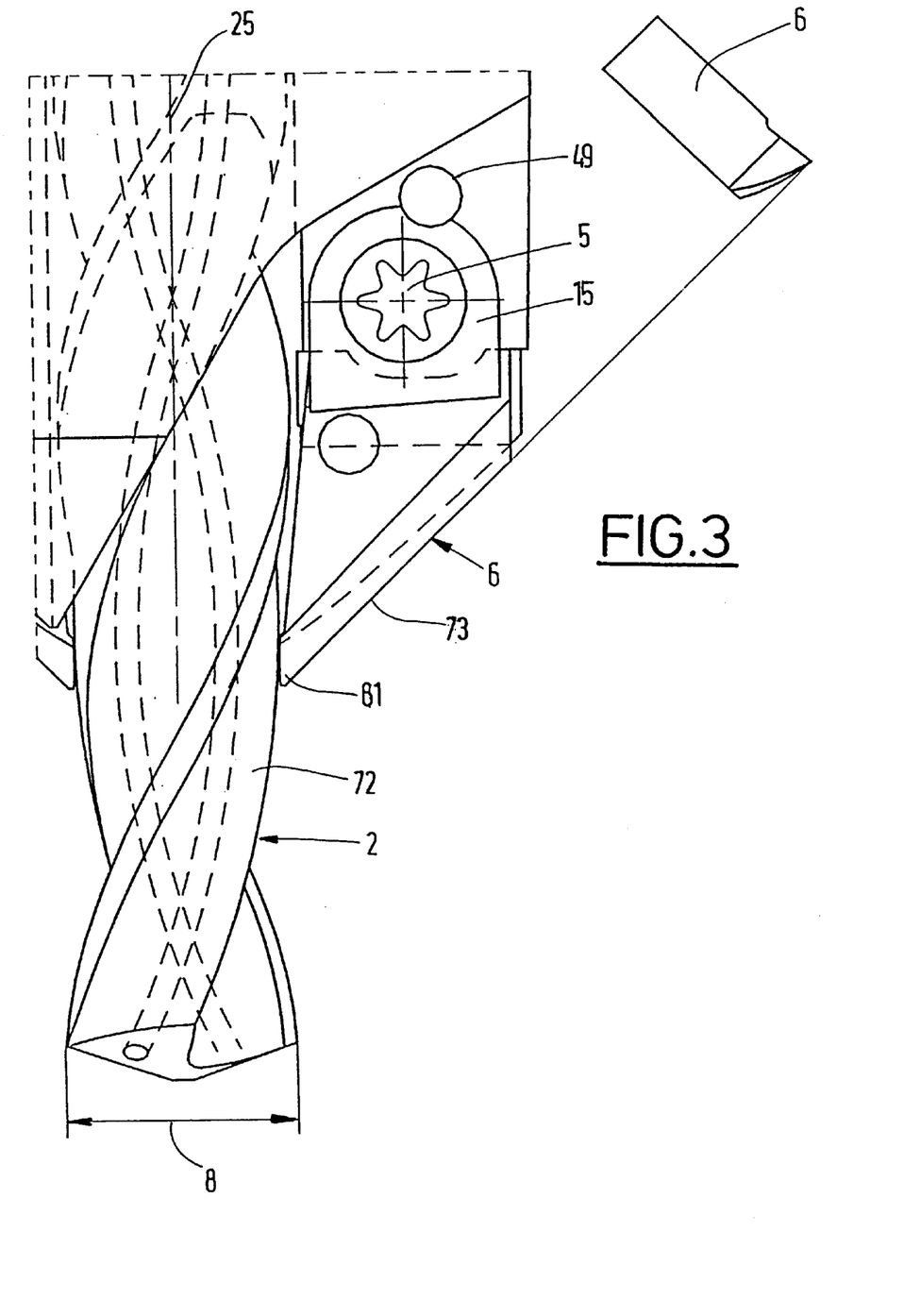
Figure 14:
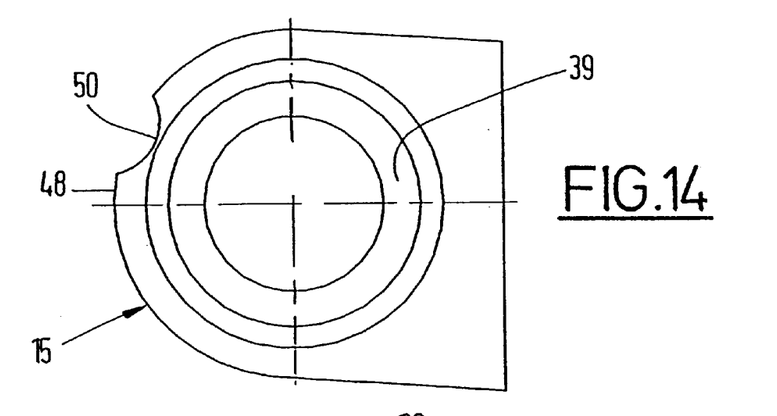
Figure 15:
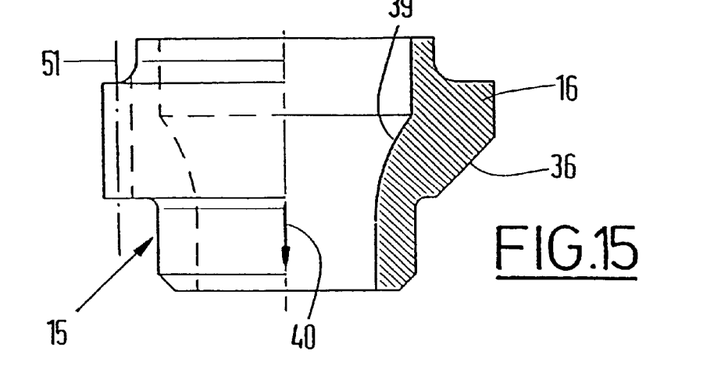

In accordance with the embodiment in the front in FIG. 3 et seq., the circumferential side 48 of the clamping claw 15 facing away from the cutter body 6 is supported by a clamping pin 49 inserted into the base body 1 parallel to the screw axis 35. The clamping claw 15 is provided with a groove-like recess 50 extending in the longitudinal groove direction 51 (FIGS. 14 and 15). The recess 50 extends approximately parallel with the screw axis 35 and the pin axis 51. It is used to insert the clamping pin 49 to form a safety against relative rotation in respect to the clamping claw 15. For example, the clamping pin can be like one described on page 21 of the brochure CONNEX 1088-3 of the firm CONNEX AG, CH-6260 Reiden and identified there as light clamping pin Type L.

The rear face 31 of the cutter body 6 is provided with a trough 52. This trough 52 (FIG. 8) is used for passing through the claw 15 or its annular collar 41, which partially lies in it and acts as a prevention against loss and is possible over the adjustment range.

The width 53 of the base body groove 22 approximately corresponds to the width 54 of the contact rib 27 which is effective at right angles to the adjustment direction 23.

Figure 6:
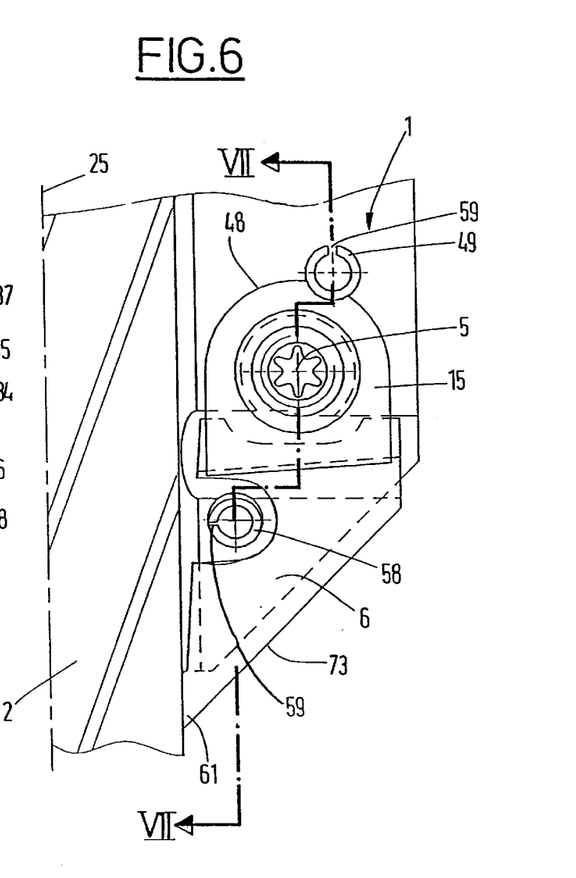

In the unloaded state, a spring member 56 projects out of the groove contact flank 29 by the distance 57 in the direction toward the pressure flank 28 of the contact rib 27 in the area of the groove end 55 on the drill side (FIG. 17). The spring element is the circumference of a clamping pin 58 inserted into the base body 1 parallel to the screw axis 35. Like the clamping pin 49, the clamping pin 58 is in the form of a pipe approximately slit in the longitudinal direction. The pipe slits 59 allow a radially inward directed spring deflection capability (FIG. 6).

Figure 4:
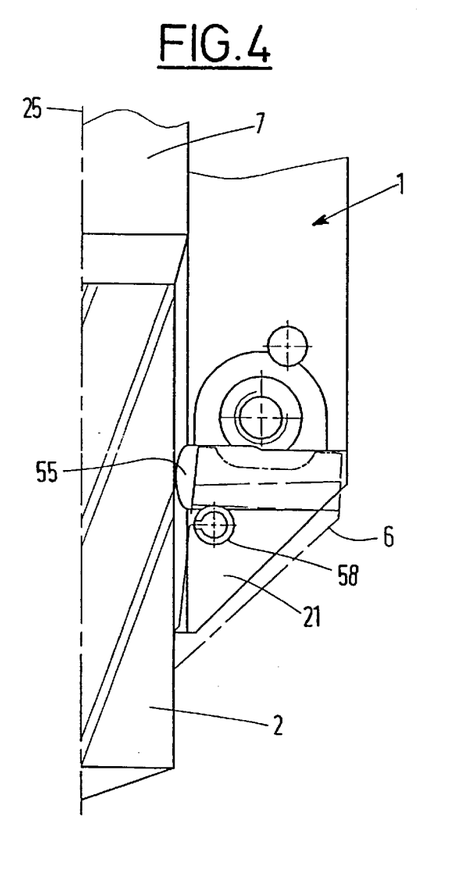

It had been stated above that the width 53 of the base body groove 22 approximately corresponds to the width 54 of the contact rib 27 which is effective at right angles to the adjustment direction 23. However, this applies in the area of the groove end 55 at the drill side with the exception that there the groove width 60 is greater than the groove width 53 in a radially more distant groove area. The size difference corresponds to the extent of the projection 57 of the clamping pin 58. This embodiment allows a simple adjustment of the chamfering cutter body 6 in relation to different working diameters of the drill 2. Adjustment is performed as follows: with the clamping screw 5 loosened, the cutter tip 61 of the cutter body 6 is placed against the lateral free face of the drill 2. This takes place while the clamping pin 58 projects past the contact flank 29 of the base body groove 22 by the distance 57. Because of the unclamped projecting clamping pin 58 (FIG. 4), the cutter body 6 rests slightly canted within the base body groove 22. Its contact rib 27 forms an acute angle with the longitudinal groove axis 23.

Figure 5:
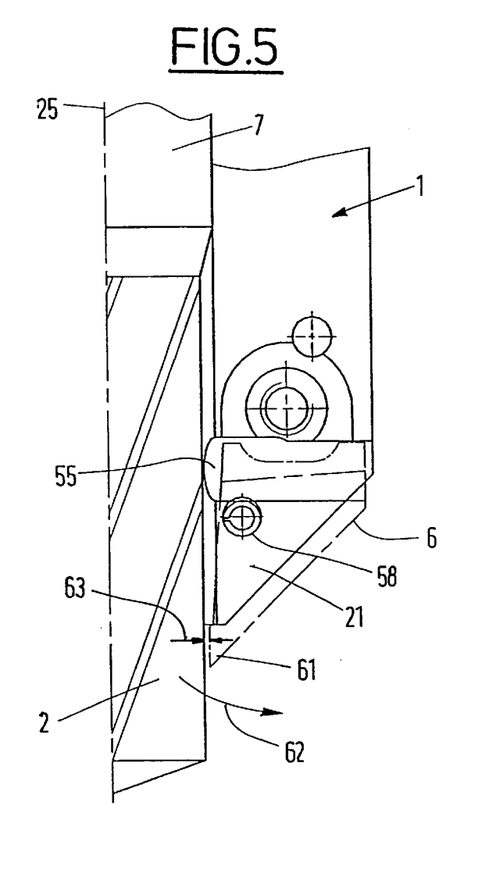

The clamping claw 15 is now clamped in that the screw 5 is tightened. In the process, cam 16 acts via the pressure face 36 on the rear inclined face 32 of the cutter body 6 and pushes it in the direction toward the drill tip. Because of this the clamping pin 58 is compressed, because its working diameter is reduced. This compressed position is shown in FIG. 5. Because of this the cutter body tip 61 performs a slight pivot in the pivot direction 62. Because of this the cutter body tip 61 loses contact with the lateral free face of the drill 2 and in the process achieves a distance from the drill 2 which serves to protect the cutter body tip 61. The size of the distance 63 can be easily determined by means of the distance 57 of the clamping pin 58 beyond the contact flank 29 of the base body groove 22 in the relaxed state.

Figure 19A:
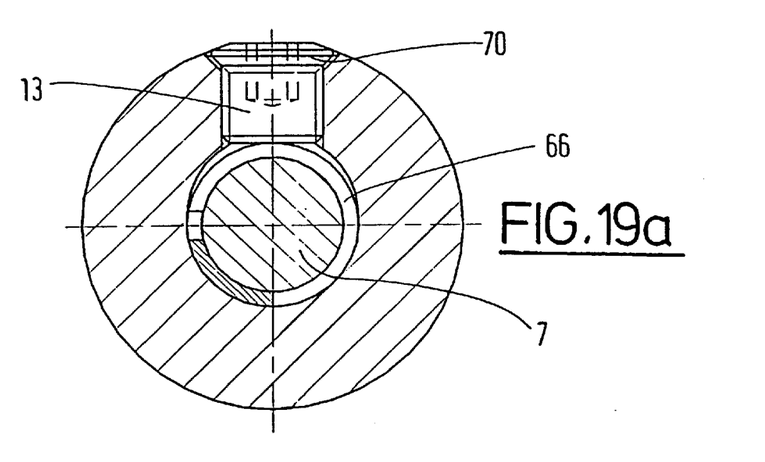
Figure 19B:
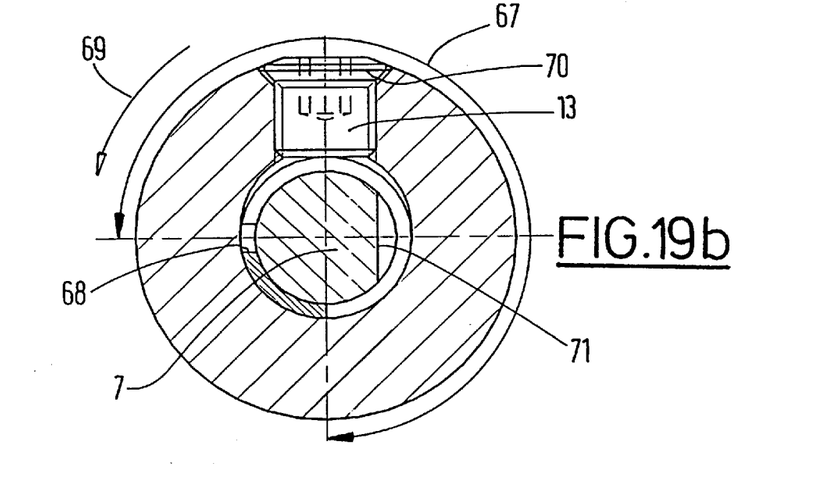
Figure 19C:
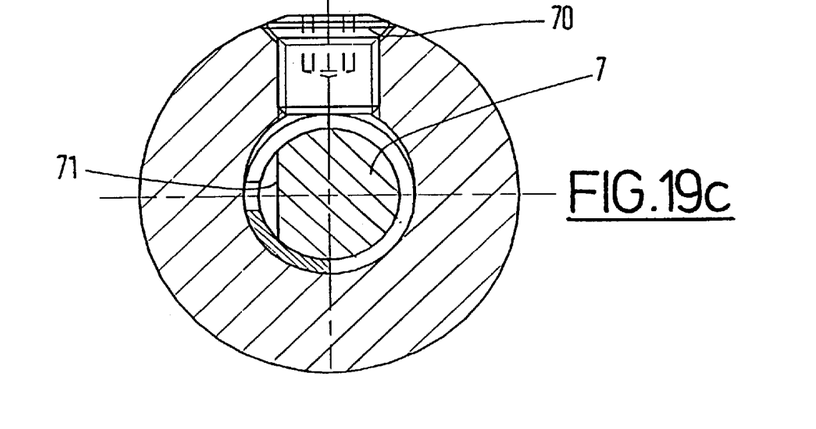
Figure 20A:
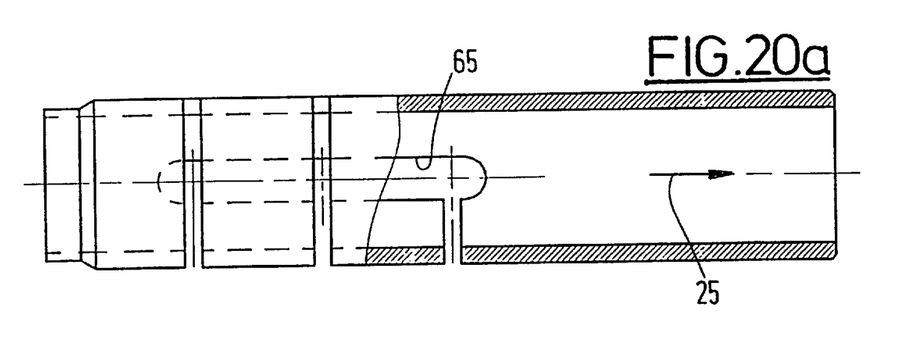
Figure 20B:
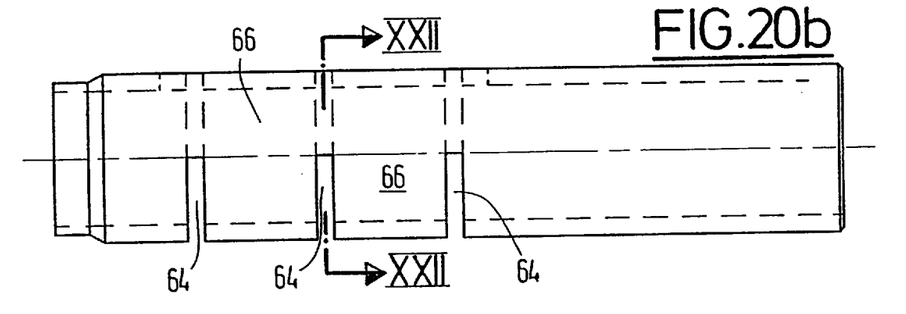
Figure 20C:
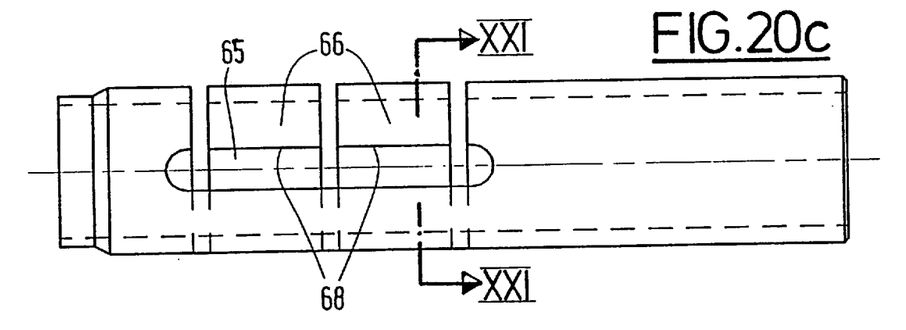
Figure 21:
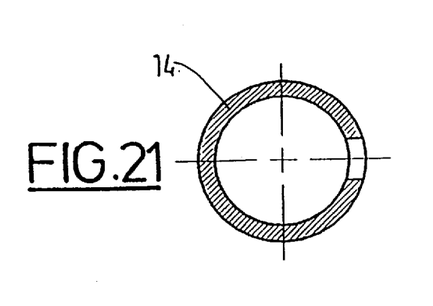
Figure 22:
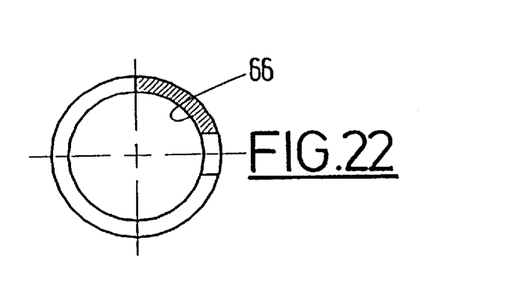

Clamping of the drill 2 takes place via its shank 7. This shank 7 is enclosed by a metallic chuck 14. This chuck 14 is provided with parallel slits 64 disposed next to each other in the circumferential direction, as well as with a chuck shell slit 65 extending in the axial direction and forming shell tongues 66 capable of spring deflection and extending over a portion of the chuck circumference. The circumferential slits 64 extends over a circumferential angle 67 of approximately 270° (FIG. 19b). By means of this they form tongues 66 between each other. The free tongue ends extend in the direction of the drill rotation direction 69. The tongues 66 of the chuck 14 are positioned in such a way that the holding screws 13 act on them in the area of the tongue ends (FIG. 19). The holding screws 13 are provided with countersunk heads 70 which limit the screw-in depth. The tongues 66 can therefore not be damaged or deformed when the flat side 71 of the shank 7 of a standard drill is located in the area where a holding screw 13 is active. Because of the alignment of a tongue end 68 in the same direction as the drill rotational direction, on which the holding screw 13 acts, the countersunk head is displaced in the direction toward the drill when the holding screw 13 is tightened and in this way is specifically brought into contact against the drill.

Figure 23:
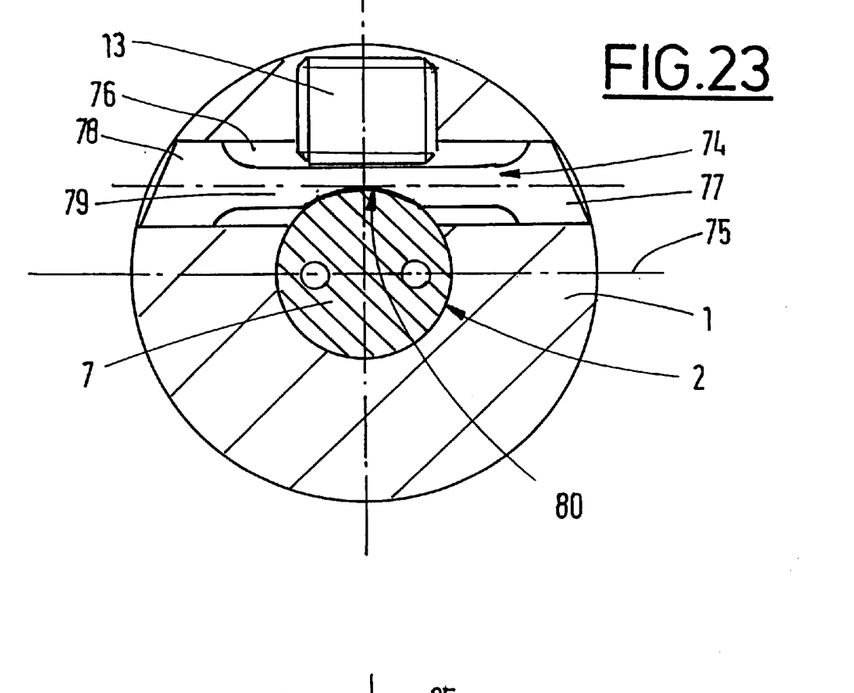

In the embodiment of clamping in accordance with FIG. 23 there is no chuck 14 clamped around the drill shank 7. Such an embodiment can be offered for reasons of construction. Here a separate spring element 74, which is inserted into a transverse bore 76 cut parallel with the diameter 75, is associated with each holding screw 13, so to speak, in place of the resilient tongues 66 in the embodiment of FIGS. 18 to 22. The spring element 74 can be produced from a cylindrical pin. It has two ends 77, 78, interlockingly inserted in the transverse bore 76 of an average reduced shank diameter 79, and a contact trough 80, adapted to the circumferential shape of the drill shank 7 in the area in which the holding screw 13 acts. The spring element 74 is used to transmit the clamping pressure to be exerted by the holding screw 13 on the drill shank 7.

Figure 18:
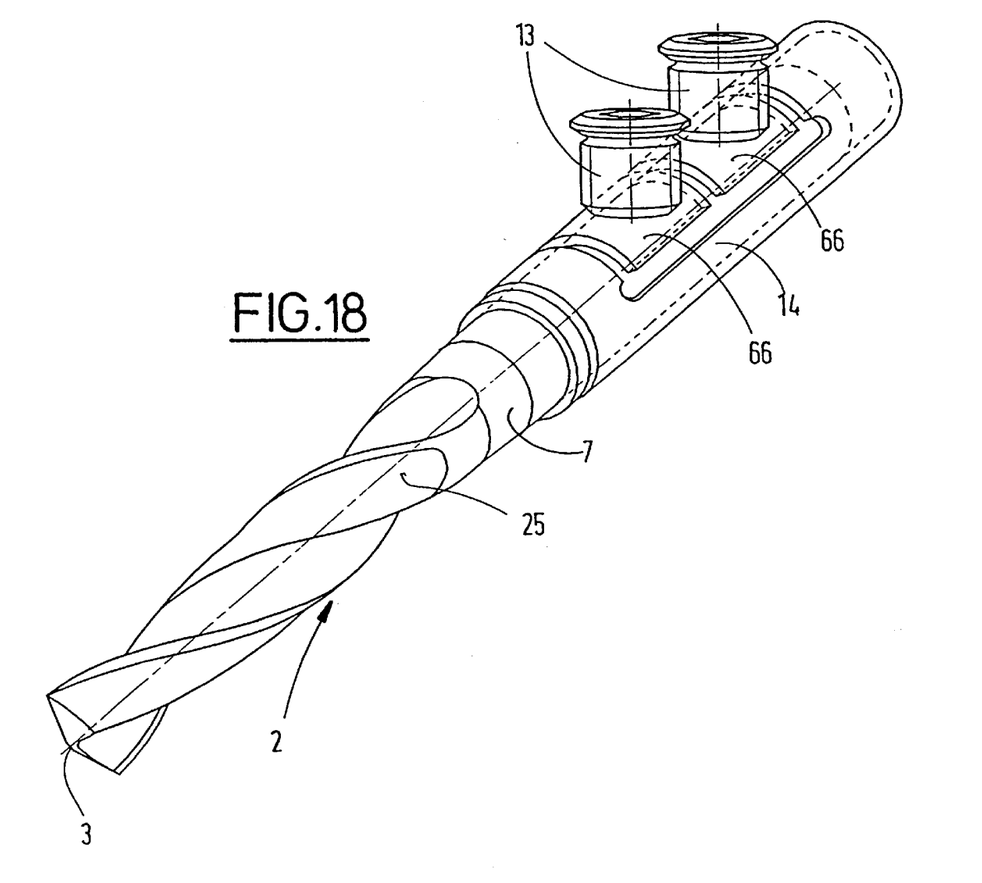
Figure 24:
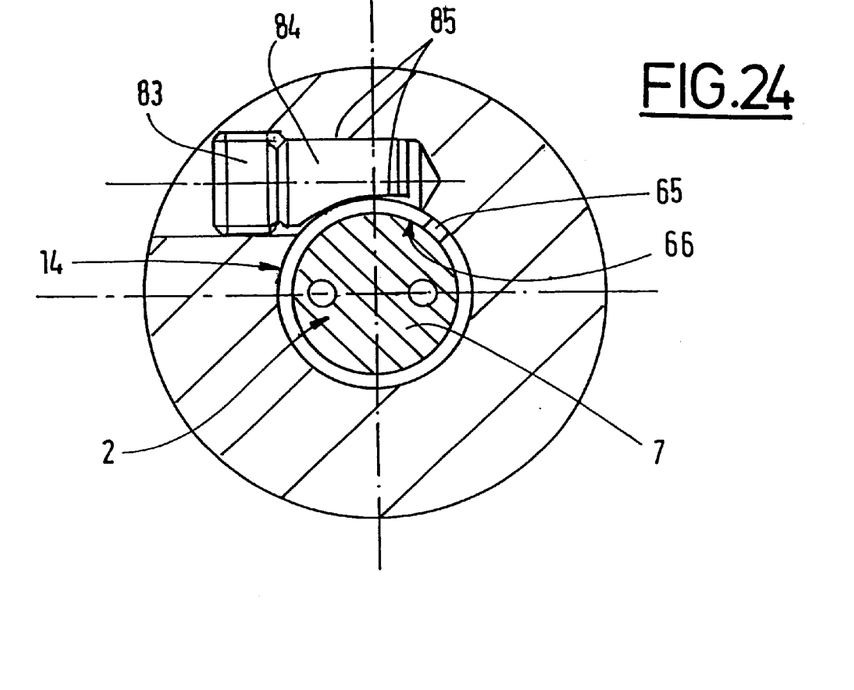

In the embodiment in accordance with FIG. 24, a holding screw 83 screwed into the base body 1 in a tangential direction in respect to the circumference of the drill shank acts on a clamping wedge 84 acting in the same direction, whose wedge face 85 acts on the spring tongues 66 of the chuck 14 enclosing the drill shank 7 in the manner of the holding screws 13 shown in FIG. 18 et seq. It is possible to provide several such clamping wedges 84, distributed in the direction of the base body axis 25, for the frictionally connected clamping of the drill shank 7. In the process, the wedge angle of the wedge face 87 can be selected such that self-locking is achieved. The wedge face 85 can also be embodied to be concavely curved in order to optimize the surface pressure and the clamping action.

We claim:

1. A rotary tool for drilling and chamfering in one common operation, comprising:

a tool holder comprising a base body having a longitudinal axis and first and second, oppositely located ends;

a drill concentrically clamped in said base body relative to the longitudinal axis to project from the first end of said base body; and a chamfering tool located at the first end of said base body and including a chamfer cutter displaceable toward said drill in a direction of adjustment extending substantially at a right angle to the longitudinal axis and into a region of a lateral face of said drill;

wherein:
the base body defines a groove extending in a longitudinal direction approximately parallel with the direction of adjustment; and
the chamfering tool includes a cutter body engaging with the groove defined by the base body and thereby being displaceable toward the drill within the groove.

2. A rotary tool as defined in claim 1, wherein said base body includes a mounting face, said groove is formed within said mounting face, and the cutter body is plate-shaped and has a contact face contacting said mounting face, and a contact projection extending away from said contact face and engaging with the base body groove, the contact projection defining a pressure flank disposed adjacent to and forming an angle with the mounting face, said cutter body being clamped to said mounting face in one of a plurality of arbitrary displacement positions.

3. A rotary tool as defined in claim 2, wherein said contact projection comprises a contact rib extending essentially in the direction of adjustment.

4. A rotary tool as defined in claim 3, wherein the contact rib extends essentially over an entire width of said cutter body and an approximate right angle to the longitudinal axis.

5. A rotary tool as defined in claim 2, wherein the contact projection includes a pressure flank, and the base body groove is defined by a groove contact flank, said cutter body being pressed in an approximate direction toward a tip of said drill so that the pressure flank is pressed with a first force against the mounting face with a second force approximately equal to the first force.

6. A rotary tool as defined in claim 2, wherein said cutter body has an end located away from a tip of said drill including a top face, a rear face and an inclined face comprising a chamfered edge therebetween;said rotary tool further comprising holding means for exerting a holding force against said chamfered edge acting in a direction approximately perpendicular to said chamfered edge.

7. A rotary tool as defined in claim 6, wherein said holding means comprises a clamping screw.

8. A rotary tool as defined in claim 2, wherein said clamping screw comprises a flathead screw having a head flank, said flathead screw being screwed into said base body in a direction approximately perpendicular to said mounting face.

9. A rotary tool as defined in claim 6, wherein said holding means comprises a clamping screw having a screw head; further comprising a clamping claw having an opening accommodating said clamping screw therein and a pressure cam, said screw head acting against said clamping claw to cause said clamping claw to act against said inclined face.

10. A rotary tool as defined in claim 9, wherein said pressure cam includes a pressure face arranged approximately parallel to said inclined face.

11. A rotary tool as defined in claim 9, wherein said screw head is cone shaped, and the opening of said clamping claw is conically shaped to correspond to the cone shape of said screw head.

12. A rotary tool as defined in claim 9, wherein said clamping screw has a screw shank having one end connected to said screw head, and said clamping claw includes an annular collar enclosing the one end of said screw shank for guiding said clamping screw in an axial direction.

13. A rotary tool as defined in claim 9, wherein said screw head has an upper screw face, and said clamping claw includes a backward grip crimped inward toward an axis of said clamping screw to enclose the upper screw face and restrain said screw head.

14. A rotary tool as defined in claim 9, wherein said clamping claw has a circumferential side, and the base body groove is defined by a lateral wall positioned away from the tip of said drill, a portion of said circumferential side positioned away from said chamfering tool being supported by said lateral wall.

15. A rotary tool as defined in claim 9, wherein said clamping claw has a circumferential side a portion thereof being positioned away from said chamfering tool; further comprising a clamping pin inserted into said base body parallel with an axis of said clamping screw and having a flank supporting the portion of said clamping claw.

16. A rotary tool as defined in claim 15, wherein the portion of the circumferential side of said clamping screw includes a recess formed therein and extending in a longitudinal direction to be essentially parallel to the axis of said clamping screw, said clamping pin being received the recess to prevent a relative rotation of said clamping claw.

17. A rotary tool as defined in claim 1, wherein said chamfer cutter has a rear face defining a trough; further comprising a clamping screw having a shank for exerting a force to hold said chamfer cutter against said base body, said shank being at least partially positioned within the trough to prevent a loss of said chamfer cutter over an entire range of displacement positions.

18. A rotary tool as defined in claim 1, wherein said chamfer cutter has a rear face defining a trough; further comprising a clamping claw having an annular collar for exerting a force to hold said chamfer cutter against said base body, said annular collar being at least partially positioned within the trough to prevent a loss of said chamfer cutter over an entire range of displacement positions.

19. A rotary tool as defined in claim 5, further comprising a spring member projecting beyond the groove contact flank and toward the pressure flank and located in a region of an end of said base body-groove.

20. A rotary tool as defined in claim 19, further comprising a clamping screw screwed into said base body in a direction approximately perpendicular to said mounting face; wherein said spring member comprises a circumference of a clamping pin, said clamping pin being inserted into said base body in a direction approximately parallel to an axis of said clamping screw.

21. A rotary tool as defined in claim 20, wherein said clamping pin comprises a pipe having a longitudinal slit formed therein so that the walls of the pipe can be spring-deflected radially inward.

22. A rotary tool as defined in claim 15, wherein said clamping pin comprises a pipe having a longitudinal slit formed therein so that the walls of the pipe can be spring-deflected radially inward.

23. A rotary tool as defined in claim 20, wherein said contact projection comprises a contact rib having a length extending in the direction of adjustment and having a width extending at a right angle to the direction of adjustment, and the base body groove has a first width approximately corresponding to the width of said contact rib, and a second width in a region of an end of the base body groove located adjacent to said drill, the second width being larger than the first width by approximately a distance corresponding to the distance said spring member projects beyond the groove contact flank.

24. A rotary tool as defined in claim 1, further comprising at least one holding screw, and a metallic chuck positioned within said base body and enclosing said drill, said chuck including at least one shell tongue being radially deflectable and extending over a portion of a circumference of said chuck, said at least one shell tongue being defined by at least two essentially parallel circumferentially arranged slits and an axially arranged chuck shell slit, said at least one holding screw extending approximately radially through a wall of said base body and acting against said at least one shell tongue to press said shell tongue against a shank of said drill.

25. A rotary tool as defined in claim 24, wherein said metallic chuck is composed of hardened steel.

26. A rotary tool as defined in claim 24, wherein said metallic chuck is composed of spring steel.

27. A rotary tool as defined in claim 24, wherein the circumferentially arranged slits extend over a circumferential angle of approximately 270°.

28. A rotary tool as defined in claim 24, wherein said shell tongue has a free end pointing in a drill rotation direction.

29. A rotary tool as defined in claim 24, further comprising means for limiting a screw-in depth of said holding screw.

30. A rotary tool as defined in claim 1, wherein said base body includes a traverse bore in a region of a shank of said drill; further comprising a spring element located in the transverse bore, and at least one holding screw extending approximately radially through a wall of said base body and acting against said spring element to indirectly clamp the shank of said drill.

31. A rotary tool as defined in claim 1, wherein said base body includes a hole tangential to a shank of said drill; further comprising a clamping wedge located in the hole and tangentially engaging with the shank of said drill, and at least one holding screw acting against said clamping wedge to indirectly clamp the shank of said drill.

* * * * *